May 23, 1933.  E. L. FONSECA  1,910,533
THERMOSTATIC CONTROL FOR ELECTRIC OVENS
Filed April 10, 1930
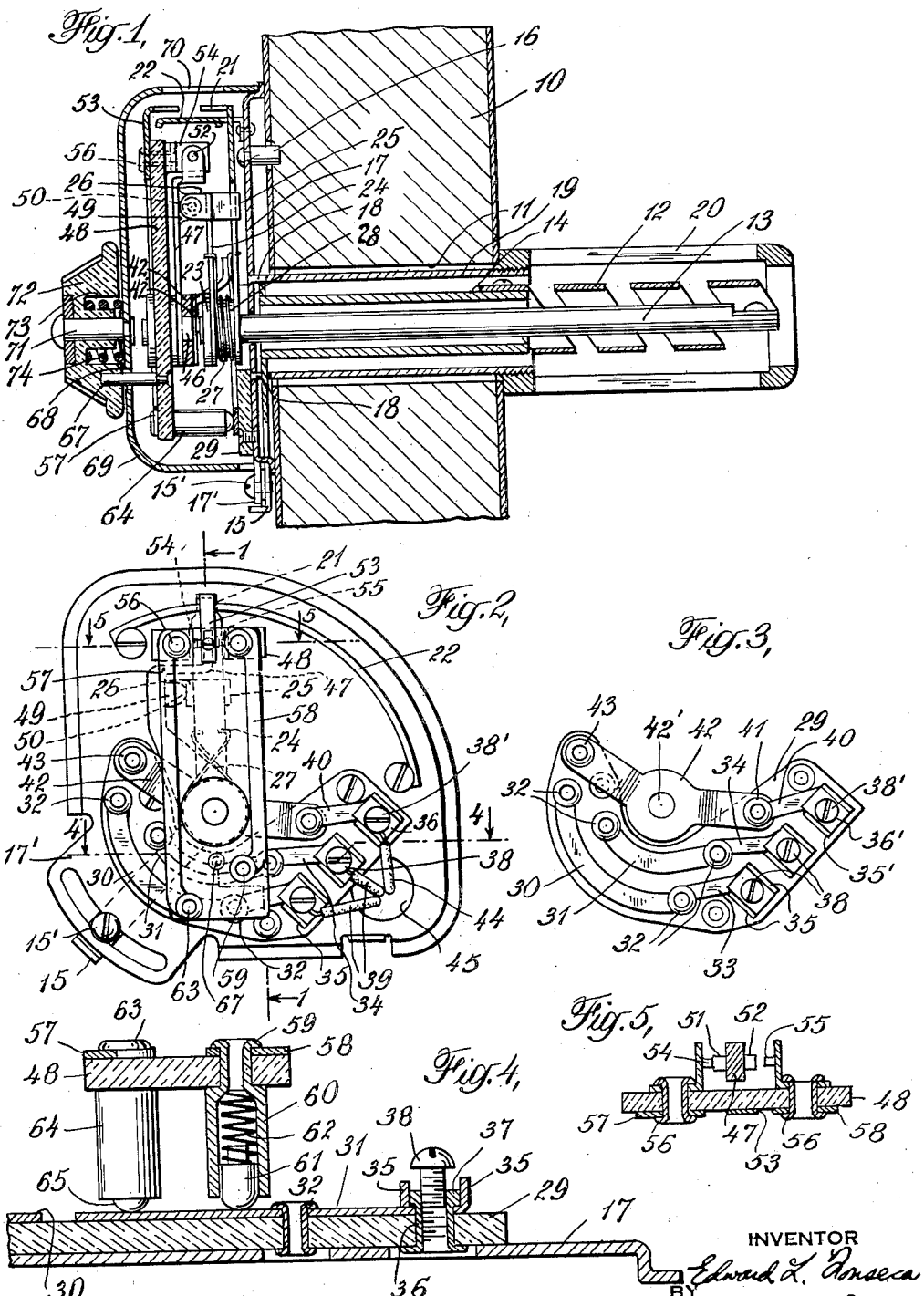
INVENTOR
Edward L. Fonseca
BY
Pennie, Davis, Marvin & Edmonds
ATTORNEYS Patented May 23, 1933

1,910,533

UNITED STATES PATENT OFFICE

EDWARD L. FONSECA, OF NEWARK, NEW JERSEY, ASSIGNOR TO THE WILCOLATOR COMPANY, OF NEWARK, NEW JERSEY, A CORPORATION OF DELAWARE

THERMOSTATIC CONTROL FOR ELECTRIC OVENS

Application filed April 10, 1930. Serial No. 443,118.

This invention relates to a thermostatic control device for controlling the temperature of an electric oven or other electric stove, and has particular reference to a thermostatic device for controlling a three-point switch, whereby one circuit is closed when the oven is below the desired temperature, and a second circuit is closed when the desired oven temperature is reached.

The principal object of this invention is to provide a thermostatic electric switch of the type described which is simple in construction, having few parts, and being devoid of any filamentary electrical connections which are liable to burn out during surges in the current, and which are adapted to conduct the current between the relatively movable parts which are adjustable by the user to operate at predetermined temperatures or adjustable by the thermostat in response to temperature changes.

Another object of this invention is to provide a self-contained electrical switch in which all electrical connections are permanently made at all times and are not subject to alteration in use or when assembling or disassembling, and the switch is so arranged that it may be handled as a complete unit, all electrical parts being permanently mounted on and permanently electrically connected in place on an insulating block.

A further object of the invention is to provide a thermostatic electric switch of the type described which may be readily calibrated in place on the oven or other heater, both by the cold check method and while hot without disconnecting any of the parts and without the liability of electrical shock to the person calibrating the device. This calibration is not disturbed in any way while mounting the device upon the oven or the like or when the cover plate is removed for inspection or repair.

These and other objects are obtained in a preferred embodiment of the invention which includes a thermostatic element of the helical strip type connected to a temperature indicating pointer, which moves over a scale and designates the temperature of the oven in which the thermostatic element is inserted. A three-point switch, which is held normally closed in one position to maintain the electrical current through the electrical heating element adapted to heat the oven, is controlled by this pointer to vary the heating effect of the heating element in accordance with a predetermined temperature preregistered upon the device by the user. This predetermined oven temperature is registered by the user by means of a knob controlling a second pointer which is adjustable in position relatively to the thermostatically controlled pointer and cooperates with the same scale with which the thermostatically controlled pointer cooperates. With this arrangement, the thermostatically controlled pointer tends to coincide with the position of the electrical switch pointer as the oven is heated to the temperature preregistered on the scale and as it moves to this position, the thermostatically controlled pointer operates the switch to break the normal circuit through the electrical oven heating element and closes a circuit which maintains the oven at the temperature which was preregistered by means of the manual pointer. The thermostatic element may be calibrated either by the cold check or hot check method by adjusting the position of a lever positioned on the device outside of the oven, the adjustment of this lever not interfering in any way with the particular setting of the device and does not require the disassembly of any part of the device.

The electrical switch parts are permanently mounted on blocks or plates of insulating material by means of eyelets inserted through the insulating plate and riveted over on the opposite side to form a permanent assembly. The terminals are also similarly emplaced on the insulating plates and comprise contact blocks having threaded eyelets passing through a bus-bar and secured through the insulating plates and carrying contact screws whereby the lead wires to the switch are adapted to be connected. Also, instead of employing filaments in the form of wires or springs for electrically connecting the relatively movable switch parts mounted upon the several insulating plates, resilient electrical brush connections are employed whereby clean and positive contact between the relatively movable parts is maintained at all times and the resilient pressure of the brushes in their cooperating contact plates or segments serves to hold the relatively movable parts between which they are interposed in any position to which they may have been adjusted by the user in setting the instrument to maintain the oven or the like at the desired predetermined temperature.

For a better understanding of the invention, reference may be made to the accompanying drawing in which, Figure 1 is an axial section of the thermostatic control device of this invention, as seen along the line 1—1 of Fig. 2;

Fig. 2 is a face view of the device with the cover plate removed;

Fig. 3 illustrates the electrical connecting means;

Fig. 4 is an enlarged cross section as seen along the line 4—4 of Fig. 2; and

Fig. 5 illustrates the contact arrangement as seen along the line 5—5 of Fig. 2.

In the drawing, numeral 10 designates the wall of the oven of an electric range, for example, this wall having an opening 11, through which is inserted the thermostatic element 12, which is in the form of a helical strip as seen in Fig. 1. One end of the thermostatic strip 12 is secured to the end of a rod 13 of Monel metal or the like, and the other end thereof is secured to the outer surface of a tube 14. The outer end of the tube 14 is secured to a lever 15, whereby the tube 14 may be rotated relatively to the rod 13 for the purpose of calibrating the thermostatic strip 12 in a manner to be described later.

Centered by dowel 16 on the outer surface of oven 10 is the frame 17 which is dished on its inner surface so as to have a peripheral flange, which is apertured at its lower edge for the reception of lever 15, as shown in Figs. 1 and 2. As shown particularly in Fig. 2, frame 17 is provided with a slotted extension 17', in the slot of which the tightening screw 15' of lever 15 is located, whereby the lever 15 may be set in any adjusted position relatively to extension 17'. Riveted to frame 17 by integral end ears 18 is a housing tube 19 which is threaded at its opposite end and is adapted to pass through opening 11 in the the oven 10. One side of the tube 19 is slotted for the passage of lever 15, the inner end of which fits in housing tube 19 so as to center tube 14 therein. Threaded on the inner end of housing tube 19 is a slotted cage 20 for enclosing the thermostatic strip 12 and the rod 13 which extend into the oven. Cage 20 also serves the purpose of securing the device on the oven, since the threaded end of cage 20 abuts the inner surface of the oven 10, and, by its connection with housing tube 19, holds the frame 17 in place on the outer surface of the open, where it is centered by the dowel 16 as aforesaid.

Also as shown in Fig. 1, the outer end of the rod 13 is journalled through frame 17 and carries the pointer 21 which is adapted to move in an arc over the scale 22 mounted upon frame 17. This scale 22 is graduated to indicate the various temperatures through the range of which the oven operates, such as from 250° F. to 550° F., for example. In addition to these temperature graduations the dial 22 may bear the usual inscriptions designating the heat at which various articles of food are to be cooked, baked, roasted, or otherwise heat treated in the oven 10. It will be seen that the position of the pointer 21 with respect to dial 22 is controlled by thermostatic strip 12, as this strip twists and untwists to rotate rod 13, which carries the pointer 21.

Journalled on rod 13 behind washer 23 is the arm 24, having two oppositely directed lugs at its free end, the lug 25 being adapted to normally engage the right hand edge of pointer 21 as seen in Fig. 2, and the lug 26 extending in the opposite direction for performing a function to be described later. Lug 25 is constrained in a normal engagement with pointer 21 by means of a torsion spring 27, whose ends engage pointer 21 and arm 24, and which is coiled about a bushing 28 mounted on rod 13 and serving to space pointer 21 and arm 24 apart. By means of this spring 27 pointer 21 and arm 24 lie in coincidence at all times and in all positions of pointer 21, during the cold or control conditions of the thermostat.

Secured to the outer surface of frame 17 by means of screws or the like as shown in Fig. 1, is a plate 29 of insulating material such as hard rubber, phenolic resin or the like, this plate being shown particularly in Fig. 3, and being recessed for the free passage of the hub of pointer 21 as shown in Fig. 1. The insulating plate 29 carries two sector-shaped segments 30 and 31, whose center of curvature is the center of the rod 13. These segments 30 and 31, as shown in Fig. 4, lie on the outer or top surface of insulating plate 29, and are secured thereto by means of eyelet rivets 32 and by no other means. It will be seen that it is only necessary to drill the insulating plate 29 at the proper points, insert eyelet rivets and rivet them over in the usual way for fastening the segments 30 and 31 to plate 29. The eyelet rivets 32 at one end of each of the segments 30 and 31 also serve the purpose of securing one end of terminal bars 33 and 34, respectively, the terminal bar 33 being electrically connected by eyelet rivet 32 to the end of segment 30, and terminal bar 34 being electrically connected to the end of segment 31 by eyelet rivet 32.

As shown in Figs. 3 and 4, the lateral edges of the free ends of terminal bars 33 and 34 are turned upwardly to form the flanges 35, and these ends of terminal bars 33 and 34 are apertured for the reception of eyelet rivet 36, which has a squared head 37 fitting closely between the two flanges 35 in the manner shown particularly in Fig. 4. This eyelet rivet 36 thus holds the ends of terminal bars 33 and 34 securely on the edge of insulating plate 29, and the squared head 37 thereof prevents any rotation of these terminal bars. Also, the eyelet rivet 36 is tapped for the reception of the binding screw 38 as shown in Fig. 4, whereby the wires 39 leading to line and resistance unit may be connected to the segments 30 and 31. Another terminal screw 38' is inserted into a similar squared-headed eyelet rivet 36', which secures in place the terminal bar 40 having the U-shaped end 35'. This terminal bar 40 is unconnected with any segment, as are the terminal bars 33 and 34, but is connected by eyelet rivet 41 to one end of the yoke 42, whose other end is secured by eyelet rivet 43 to insulating plate 29 in such a way that the yoke 42 bridges the recess in insulating plate 29 and lies in alignment with the center of rod 13, as shown in Fig. 1. The terminal screw 38' of terminal bar 40 is connected to wire 44 as shown in Fig. 3, this wire, together with wires 39 passing through an aperture 45 in frame 17, and through a corresponding opening in the oven wall 10, not shown.

Mounted on yoke 42 and aligned axially with rod 13 is a stud 46 upon which is journalled the electrical contact arm 47 and the radial insulating lever 48. The electrical contact arm 47 has a lateral projection 49 upon which is mounted the insulating button 50 adapted to be engaged by the lug 26 of arm 24. The free end of contact arm 47 carries the contacts 51 and 52 on its opposite surfaces, as shown in Fig. 5.

Insulating lever 48 carries at its free end the pointer 53 adapted to cooperate with scale 22 at the side opposite to pointer 21. The free end of insulating lever 48 carries the two lateral contact lugs 54 and 55 adapted to engage respectively with contacts 51 and 52 of contact arm 47. These contact lugs 54 and 55 are secured to insulating lever 48 by eyelet rivets 56, and these eyelet rivets 56 also secure to the opposite surface of insulating lever 48 one end of each of the bus bars 57 and 58, bus bar 57 being electrically connected by eyelet rivet 56 with contact lug 54, while bus bar 58 is in turn electrically connected by eyelet rivet 56 to contact lug 55.

These bus bars 57 and 58 extend along the edge of insulating lever 48 toward its lower end and, as shown in Fig. 4, bus bar 58 is secured at its lower end to insulating lever 48 by eyelet rivet 59, which has a socketed extension 60 mounted on the opposite surface of insulating lever 48. This socketed extension 60 registers with segment 31 on insulating plate 29, and carries in its recess a contact button or brush 61, which is constrained into frictional contact with segment 31 by means of the coil spring 62. The other bus bar 57 of insulating lever 48 is similarly connected at its lower end to the insulating lever 48 by eyelet rivet 63, also having an extension 64 on the opposite surface of lever 48 in which is slidably mounted behind a coil spring not shown, the contact button or brush 65, which is in continuous engagement with segment 30 of insulating plate 29.

Thus, as insulating lever 48 is moved, the contact buttons or brushes 61 and 65 are in continuous engagement with segments 31 and 30 respectively, so that bus bar 58 and segment 31 are electrically connected and bus bar 57 and segment 30 are also electrically connected. The springs behind the contact buttons or brushes 61 and 65 maintain these buttons in frictional contact with segments 31 and 30, respectively, so that the insulating lever 48 may be moved into any position, and will then be held in that position by the frictional action of contact buttons 61 and 65. The eyelet rivets 32 serve as stops to limit the movement of insulating lever 48 in either direction. For example, the eyelet rivet on the free end of segment 31, limits the movement of the insulating lever 48 in a clockwise direction, inasmuch as contact button 61 will engage therewith and, likewise, the eyelet rivet on the right-hand end of segment 30, as seen in Fig. 3, will stop contact button 65 against movement beyond that point in a counter-clockwise direction.

Projecting outwardly from the lower end of insulating lever 48 is a pin 67 which passes through a curved slot 68 in cover plate 69, which is adapted to enclose the mechanism, and which has in its upper surface a slot 70 through which the scale 22 and the pointers 21 and 53 may be observed. The cover plate 69 is mounted upon the frame 17 either by a friction fit over the flange of frame 17, or by suitable fastening means not shown. Journalled upon a stud 71 projecting from the outer surface of cover plate 69, is a knurled knob 72 having an annular recess 73, in which is mounted the coil spring 74, which frictionally holds knob 72 in whatever position it may be moved by the user. The knob 72 is provided with a hole near one edge thereof, in which is adapted to be inserted the pin 67, so that rotation of knob 72 causes a corresponding angular movement of insulating lever 48, its attached pointer 53, and contact lugs 54 and 55.

In operation, assuming that the user wishes the oven to be heated to, say 550° F., she grasps knob 72 and rotates it in a counter-clockwise direction until pointer 53 designates the inscription "550°" upon the scale 22. At this time the contacts 52 and 55 are in engagement and the current traverses the wire 39 connected to the binding screw 38 of terminal bar 34, segment 31, contact brush or button 61, rivet extension 60, rivet 59, bus bar 58, contact lug 55, contact 52, contact arm 47, yoke 42, rivet 41, terminal bar 40, binding screw 38', and wire 44 connected thereto. The user then turns on the electrical switch, no shown, and starts the oven into operation, or this may be done before the thermostat is set.

As the oven heats up, thermostatic strip 12, in response to the heating of the oven, twists to rotate rod 13 carrying the pointer 21, so that the latter moves over scale 22 toward adjusted pointer 53, the pointer 21 carrying with it the arm 24 because of the lug 25 which connects the latter with the pointer 21. Just before the pointer 21 reaches a position coincident with the position of adjusted pointer 53, lug 26 of arm 24 engages insulating button 50 of contact arm 47 to move the latter. This movement of contact arm 47 causes the connection between its contact 52 and contact lug 55 to be broken, and makes the connection between its contact 51 and contact lug 54, thereby completing another circuit traceable from binding screw 38 of terminal bar 33, segment 30, contact button 65, rivet extension 64, rivet 63, bus bar 57 of insulating lever 48, contact lug 54, contact 51 of contact arm 47, yoke 42, terminal bar 40, binding screw 38, and wire 44 connected to the latter and leading to any well known form of apparatus intended to control the main circuit which supplies the electricity to the heating elements, but such apparatus and the particular manner in which it is connected, form no part of the present invention, and therefore need not be further discussed.

The reverse operation takes place when the oven cools down, and it will be seen that the return movement of thermostatically controlled pointer 21 will not interfere in any way with the setting of adjustable pointer 53, so that if the user wishes to use the oven a number of times at the same temperature, she is not required to set the device each time the oven is to be used, nor is she prevented from resetting pointer 53 while the oven is hot.

The lever 15 for adjusting the thermostatic strip 12 for calibration purposes may be moved to the right or left upon loosening screw 15' in the slot of extension 17' of frame 17. This movement of lever 15 changes the position of the fixed end of the thermostatic strip 12 and changes its thermo-responsive characteristics. This calibration may be done while the device is emplaced upon the oven, and without disassembling any part thereof, and is particularly adapted and valuable for calibrating the device either by the cold check or hot check methods, which permits calibration of the device to each individual oven and eliminates careful and expensive calibration of the device at the factory, which calibration may be disturbed in handling, or be inaccurate when mounted upon the oven.

It will be seen that the new thermostatic control device of this invention eliminates all live wires which are liable to become broken or loosened from their terminals and might cause a short circuit, the variable connection being formed by the contact buttons or brushes engaging the segments, these contact buttons or brushes serving the additional purpose of providing means whereby the adjusting mechanism is maintained in any preset position regardless of any subsequent vibration, shocks or jars. This arrangement also renders the device fool-proof, and not liable to damage through operating abuse, and any rapid back or forth movement of the insulating lever 48 through its maximum angle is limited in both directions by the engagement of contact buttons 61 and 65 with the heads of the pilot rivets 32, which secure the corresponding segments 31 and 30 to the stationary insulating plate 29. The engagement of adjusting knob pin 67 with the ends of its slot in the face of cover plate 69 may also be utilized to stop the movement of the insulating lever 48 and its associated parts in either direction instead of employing the engagement of buttons 61 and 65 with respective segments 31 and 30 to accomplish this. It is also intended that an imperforate piece of insulating material 42', shaped like yoke 42, be placed under this yoke in order to prevent grounding of the end of rod 13 with yoke 42 should the rod be pushed by accident toward this yoke. Thus, no damage can be caused mechanically, nor any short circuiting. The device may be readily mounted upon the oven simply by inserting the housing tube 19 through the opening 11 in the wall of oven 10, registering dowel 16 with its corresponding recess in the outside wall of oven 10, and then tightly screwing in place the cage 20 on the protruding end of housing tube 19, this cage 20 serving as a guard for the thermostatic element 12 and rod 13 within the oven. It will also be seen that the contacting elements constitute two sub-assemblies, one being the insulating plate 29 and its attached parts shown in Fig. 3, and the other being the insulating lever 48 and its attached parts.

While a preferred embodiment of the invention has been illustrated and described herein, it is to be understood that it is not limited thereby, but is susceptible of many changes in form, detail and arrangement within its scope.

I claim:

1. In a thermostatically controlled electrical switch, the combination of a thermostat, an arm actuated thereby and resiliently connected thereto, an electrical contact member controlled by said arm, a second electrical contact member adapted to engage said first contact member, means for adjusting said second contact member, a stationary electrical contact plate, and a brush on one of said contact members in wiping engagement with said contact plate, whereby continuous electrical contact between said contact plate and said one contact member is maintained for any adjusted position of the latter.

2. In a thermostatically controlled electrical switch, the combination of a thermostat, an arm actuated thereby and resiliently connected thereto, an electrical contact member controlled by said arm, a second electrical contact member adapted to engage said first contact member, means for adjusting said second contact member, a stationary member mounted parallel to the path of movement of at least a part of one of said contact members, a segment mounted on said stationary member, a brush mounted on said one contact member and continuously engaging said segment during all adjusted positions of said one contact member, and a spring interposed between said brush and said one contact member for urging said brush into frictional engagement with said segment.

3. In a thermostatically controlled electric switch the combination of a thermostat, an arm pivotally mounted and carrying an electrical contact at its outer end and resiliently connected to said thermostat for actuation thereby, a pivotally mounted member carrying a contact adapted to cooperate with said movable contact, means for adjusting the position of said pivotally mounted member, an insulating block mounted parallel to said pivotally mounted member and having thereon strips of conducting material, one of said strips being adapted to contact with said lever and a spring pressed brush mounted on said member and adapted to contact with another of said strips of conducting material, and terminal connections connected with said conducting strips.

In testimony whereof I affix my signature.

EDWARD L. FONSECA.